United States Patent
Yu et al.

(10) Patent No.: US 10,707,456 B2
(45) Date of Patent: Jul. 7, 2020

(54) BATTERY CONNECTING UNIT AND BATTERY PACK INCLUDING THE SAME

(71) Applicant: LG CHEM, LTD., Seoul (KR)

(72) Inventors: Seung-Sik Yu, Daejeon (KR);
Sung-Jong Kim, Daejeon (KR);
Tae-Sung Kim, Daejeon (KR);
Jun-Yeob Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 120 days.

(21) Appl. No.: 15/744,267

(22) PCT Filed: Sep. 27, 2016

(86) PCT No.: PCT/KR2016/010826
§ 371 (c)(1),
(2) Date: Jan. 12, 2018

(87) PCT Pub. No.: WO2017/069421
PCT Pub. Date: Apr. 27, 2017

(65) Prior Publication Data
US 2018/0205050 A1    Jul. 19, 2018

(30) Foreign Application Priority Data
Oct. 22, 2015 (KR) .......... 10-2015-0147514

(51) Int. Cl.
*H01M 2/06* (2006.01)
*H01M 2/30* (2006.01)
(Continued)

(52) U.S. Cl.
CPC .......... *H01M 2/1016* (2013.01); *H01M 2/043* (2013.01); *H01M 2/06* (2013.01);
(Continued)

(58) Field of Classification Search
CPC .......... H01M 2/307; H01M 2/06; H01M 2/30; H01M 2/305
See application file for complete search history.

(56) References Cited

U.S. PATENT DOCUMENTS

| 6,819,081 B2 | 11/2004 | Izawa et al. |
| 2002/0132160 A1* | 9/2002 | Ehara .................. H01M 2/0285 429/53 |

(Continued)

FOREIGN PATENT DOCUMENTS

| CN | 104813504 A | 7/2015 |
| EP | 1 347 522 A1 | 9/2003 |

(Continued)

OTHER PUBLICATIONS

International Search Report (PCT/ISA/210) issued in PCT/KR2016/010826, dated Mar. 13, 2017.

*Primary Examiner* — Maria Laios
(74) *Attorney, Agent, or Firm* — Birch, Stewart, Kolasch & Birch, LLP

(57) ABSTRACT

Disclosed is a battery connecting unit which is placed on a lower housing and protruding from an upper housing and thus is suitable for preventing water penetration from the outside of the upper housing, and a battery pack including the same. The battery connecting unit is electrically connected to a battery laminate between a lower housing and an upper housing of a battery pack and includes a plastic member configured to come into contact with the upper housing and a metal terminal inserted into the upper housing, wherein the plastic member partially surrounds the metal terminal, and wherein the metal terminal is made of a circular pillar. In addition, the battery pack includes the battery connecting unit.

15 Claims, 7 Drawing Sheets

(51) Int. Cl.
*H01M 2/10* (2006.01)
*H01M 2/04* (2006.01)
*H01M 2/26* (2006.01)
*H01M 10/42* (2006.01)

(52) U.S. Cl.
CPC ........... *H01M 2/1072* (2013.01); *H01M 2/26* (2013.01); *H01M 2/30* (2013.01); *H01M 2/307* (2013.01); *H01M 10/42* (2013.01); *H01M 2220/20* (2013.01)

(56) References Cited

U.S. PATENT DOCUMENTS

| | | | |
|---|---|---|---|
| 2005/0238955 A1* | 10/2005 | Hooke | H01M 2/0434 429/181 |
| 2007/0122696 A1 | 5/2007 | Richter et al. | |
| 2008/0241677 A1* | 10/2008 | Garcia Alberola | H01M 2/06 429/181 |
| 2011/0014513 A1* | 1/2011 | Lange | H01M 2/043 429/175 |
| 2012/0115022 A1* | 5/2012 | Kado | H01M 2/30 429/179 |
| 2012/0214053 A1 | 8/2012 | Kim | |
| 2015/0140393 A1 | 5/2015 | Yamamoto et al. | |
| 2015/0140414 A1 | 5/2015 | Kim | |
| 2015/0303437 A1 | 10/2015 | Streuer et al. | |

FOREIGN PATENT DOCUMENTS

| | | |
|---|---|---|
| EP | 1 947 709 A1 | 7/2008 |
| JP | 52-137644 A | 11/1977 |
| JP | 10-069893 A | 3/1998 |
| JP | 2008-300205 A | 12/2008 |
| JP | 2010-272319 A | 12/2010 |
| JP | 2012-174684 A | 9/2012 |
| JP | 2014-035828 A | 2/2014 |
| JP | 2015-49930 A | 3/2015 |
| KR | 2003-0066382 A | 8/2003 |
| KR | 10-0879532 B1 | 1/2009 |
| KR | 10-2015-0056374 A | 5/2015 |
| WO | WO 2014/020731 A1 | 2/2014 |

\* cited by examiner

BATTERY CONNECTING UNIT AND BATTERY PACK INCLUDING THE SAME

TECHNICAL FIELD

The present disclosure relates to a battery connecting unit suitable for preventing water penetration from the outside, and a battery pack including the same.

The present application claims priority to Korean Patent Application No. 10-2015-0147514 filed on Oct. 22, 2015 in the Republic of Korea, the disclosures of which are incorporated herein by reference.

BACKGROUND ART

Recently, in order to reduce air pollution caused by an exhaust gas of vehicles, a vehicle is manufactured based on the study for ensuring a driving force with an internal combustion engine and/or an electric motor. Accordingly, the vehicle has evolved in the order of a hybrid vehicle, a plug-in hybrid vehicle, and an electric vehicle. In this case, the hybrid vehicle and the plug-in hybrid vehicle include an internal combustion engine, an electric motor and a battery pack, and the electric vehicle includes an electric motor and a battery pack without an internal combustion engine.

In addition, the battery pack has also evolved along with the hybrid vehicle, the plug-in hybrid vehicle and the electric vehicle. The battery pack is configured to be charged in and/or out of the electric vehicle. The battery pack has a battery laminate surrounded by a lower housing and an upper housing and composed of secondary batteries included therein. Here, the lower housing has at least one electric terminal electrically connected to the battery laminate. The electric terminal is surrounded by a rubber sealing and inserted into a through hole of the upper housing to protrude from the upper housing.

In this case, if the rubber sealing is badly deformed elastically between the lower housing and the upper housing, the rubber sealing partially opens a space between the upper housing and the electric terminal. The bad elastic deformation of the rubber sealing allows water to penetrate toward the through hole of the upper housing from the outside of the upper housing. The penetration of water forms a water flow path along the electric terminal toward the inside of the battery pack and causes an electric short among components in the battery pack.

Therefore, various studies have been made in order to prevent an electric short among components in the battery pack, caused by the penetration of water. Among the studies, there is Japanese Unexamined Patent Publication H10-69893 (published on Mar. 10, 1998), entitled "a pack battery having an electrode window with a water proof structure". The pack battery includes a rubber sponge and a terminal holder between a lower case and an upper case. The rubber sponge is located on the terminal holder, and the terminal holder has a convex electrode portion surrounded by the rubber sponge.

The convex electrode portion is covered with an electrode terminal at its upper side and inserted into the electrode window of the upper case. The rubber sponge is stably pressed by the upper case at the inside of the pack battery to make elastic deformation, thereby shielding a space between the electrode window and the convex terminal portion. However, if the rubber sponge is aged during the service life of the battery pack, the rubber sponge is hardened in comparison to a time when it is initially mounted to the convex terminal portion, thereby being easily worn out or corroded due to a friction with peripheral components.

The wear and corrosion of the rubber sponge results in imperfect shielding of the space between the upper case and the convex terminal portion through the electrode window of the upper case. In this way, if the rubber sponge is aged, water may penetrate toward the electrode window of the upper case from the outside of the upper case.

DISCLOSURE

Technical Problem

The present disclosure is designed to solve the problems of the related art, and therefore the present disclosure is directed to providing a battery connecting unit suitable for surely preventing water from penetrating through a connection window from the outside of an upper housing even though the battery connecting unit is placed on a lower housing and protrudes from the connection window of the upper housing in order to couple the lower housing and the upper housing to each other, and a battery pack including the same.

Technical Solution

In one aspect of the present disclosure, there is provided a battery connecting unit, which is electrically connected to a battery laminate between a lower housing and an upper housing of a battery pack and includes a plastic member configured to come into contact with the upper housing and a metal terminal inserted into the upper housing, wherein the plastic member surrounds a lower portion of the metal terminal in a cylindrical shape and exposes an upper portion of the metal terminal, and wherein the metal terminal is made of a circular pillar and includes an annular protrusion and a gear-shaped protrusion pattern, formed at a sidewall of the circular pillar, in the lower portion of the metal terminal.

Preferably, the plastic member may include a lower buffer and an upper buffer which are positioned in order and formed integrally, and the lower buffer may have a smaller outer diameter than the upper buffer.

In an embodiment, the lower buffer may surround by the annular protrusion, and the upper buffer may surround the gear-shaped protrusion pattern.

In another embodiment, the lower buffer may be inserted into a support of the lower housing, and the upper buffer may be welded to the upper housing made of plastic through an end thereof.

Meanwhile, there may be provided a plurality of protrusions positioned in different levels at the sidewall of the circular pillar, and there may be provided a plurality of protrusion patterns positioned in different levels at the sidewall of the circular pillar. Here, the protrusion pattern may have saw-tooth portions in the same level at the sidewall of the circular pillar.

According to the present disclosure, the circular pillar of the metal terminal may serve as a plug contact at the upper portion of the metal terminal, and the circular pillar of the metal terminal may have connection grooves at a sidewall of the circular pillar at the upper portion of the metal terminal.

According to the present disclosure, the metal terminal may be electrically connected to the battery laminate through the lower buffer.

In another aspect of the present disclosure, there is also provided a battery pack, comprising: a lower housing including at least one battery connecting unit; a battery laminate accommodated in the lower housing and electrically connected to the battery connecting unit; and an upper housing made of plastic and configured to cover the lower housing and the battery laminate, wherein the battery connecting unit includes a metal terminal and a plastic member partially surrounding the metal terminal, and wherein the metal terminal is provided through the upper housing, and the plastic member is fixed to the upper housing at a lower portion of the upper housing.

Preferably, the metal terminal may be made of a circular pillar and includes an annular protrusion and a gear-shaped protrusion pattern, formed at a sidewall of the circular pillar, in the lower portion of the metal terminal, and the circular pillar of the metal terminal may serve as a plug contact at the upper portion of the metal terminal.

In an embodiment, the plastic member may include a lower buffer and an upper buffer which are positioned in order and formed integrally, the lower buffer may have a cylindrical shape to surround the annular protrusion, and the upper buffer may have a cylindrical shape with a greater outer diameter than the lower buffer to surround the gear-shaped protrusion pattern.

According to the present disclosure, the upper housing may have flat surfaces at one side coming into contact with the plastic member and the other side opposite thereto.

Optionally, the upper housing may have a concave portion formed at one side in contact with the plastic member to accommodate the plastic member and a convex portion formed at the other side to correspond to the concave portion.

According to the present disclosure, the upper housing may be welded along a protrusion located at an end of the plastic member by means of laser welding.

Optionally, the upper housing may be welded to a protrusion located at an end of the plastic member along the convex portion by means of laser welding.

Advantageous Effects

The battery connecting unit according to the present disclosure may surely prevent water from penetrating through a connection window from the outside of an upper housing when laser welding is applied to a plastic member and the upper housing made of plastic, since the battery connecting unit includes a plastic member placed on a lower housing at a battery pack and a metal terminal partially surrounded by the plastic member and protruding from the connection window of the upper housing.

The battery pack according to the present disclosure may prevent an electric short among components between the lower housing and the upper housing, caused by water penetrating through the connection window from the outside of the upper housing, by welding a plastic member to the upper housing at a location below the upper housing by means of the plastic member and the metal terminal of the battery connecting unit and also exposing the metal terminal from the connection window of the upper housing.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the embodiment described below, a battery cell means a secondary battery. Here, a lithium secondary battery generally calls a secondary battery in which lithium ions serve as operation ions during a charging and discharging process to cause electrochemical reactions at positive and negative electrodes. However, it is obvious that the present disclosure is not limited thereto.

Figure 1:
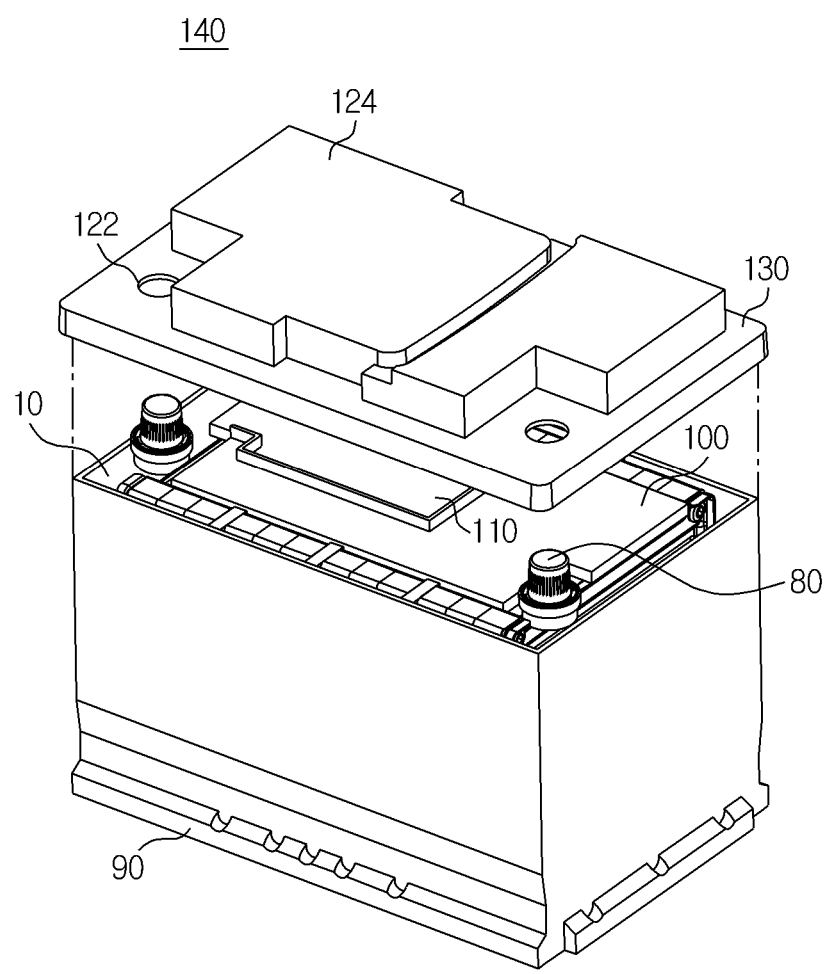
FIG. 1 is an exploded perspective view schematically showing a battery pack according to an embodiment of the present disclosure.

FIG. 1 is an exploded perspective view schematically showing a battery pack according to an embodiment of the present disclosure.

Referring to FIG. 1, a battery pack 140 according to the present disclosure includes a lower housing 90, a battery laminate 100, an electronic circuit part 110 and an upper housing 130. The lower housing 90 is configured to accommodate the battery laminate 100. The lower housing 90 includes supports 10 located at a periphery of the battery laminate 100 and battery connecting units 80 located respectively on the supports 10.

The supports 10 allow the battery connecting units 80 to be placed. The battery connecting units 80 are electrically connected to the battery laminate 100 through electric lines L of FIG. 2 on the supports 10. Preferably, the lower housing 90 may be composed of an insulator made of plastic other materials. The battery laminate 100 is located between the supports 10 and includes battery cells (not shown).

Preferably, the battery cells may be pouch-type battery cells. The electronic circuit part 110 is electrically connected to the battery laminate 100, and though not shown in the figure, the electronic circuit part 110 may include electric components such as a processor, an analog front-end circuit and a switch, which are used for controlling a charging or discharging process of the battery cells of the battery laminate 100 or sensing a current or voltage of each battery cell.

The upper housing 130 has curved portions 124 corresponding to the shape of the electric components of the electronic circuit part 110 and covers the lower housing 90, the battery laminate 100 and the electronic circuit part 110. In addition, the upper housing 130 has connection windows 122 respectively corresponding to the battery connecting units 80. Preferably, the upper housing 130 may be made of plastic.

Figure 2:
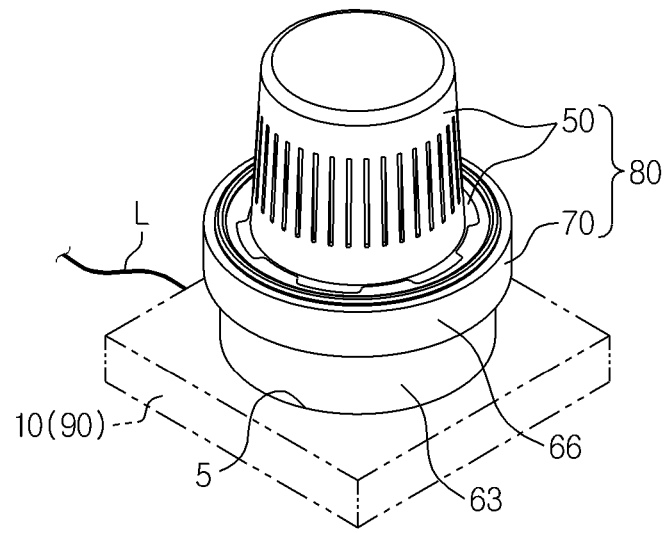
FIG. 2 is a partially enlarged perspective view showing a battery connecting unit placed on a lower housing, employed at the battery pack of FIG. 1.

FIG. 2 is a partially enlarged perspective view showing a battery connecting unit placed on a lower housing, employed at the battery pack of FIG. 1.

Referring to FIG. 2, the battery connecting unit 80 is located at the support 10 of the lower housing 90 and inserted into a fitting hole 5 of the support 10. The battery connecting unit 80 includes a metal terminal 50 and a plastic member 70 partially surrounding a lower portion of the metal terminal 50. Preferably, the metal terminal 50 is made of a cupper (Cu) material with a circular pillar shape.

In an embodiment, the plastic member 70 surrounds a lower portion of the metal terminal 50 in a cylindrical shape and exposes an upper portion of the metal terminal 50. In more detail, the plastic member 70 includes a lower buffer 63 and an upper buffer 66 which are positioned in order and formed integrally. Preferably, the lower buffer 63 has a smaller outer diameter than the upper buffer 66.

More preferably, though not shown in the figures, the lower buffer 63 exposes a bottom of the metal terminal 50 at a side opposite to the upper buffer 66. Here, the metal terminal 50 comes into contact with the electric line L through the lower buffer 63 and is electrically connected to the battery laminate 100 of FIG. 1 by using the electric line L.

FIGS. 3 to 7 are schematic views for illustrating a method for manufacturing the battery pack of FIG. 1.

Figure 3:
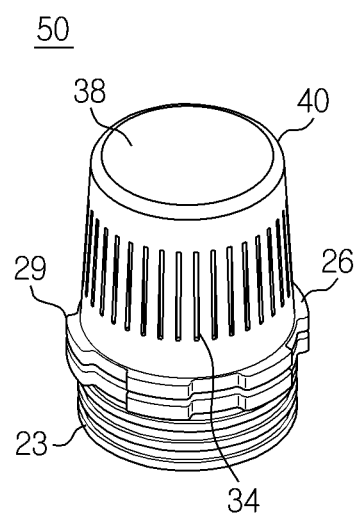
FIGS. 3 to 7 are schematic views for illustrating a method for manufacturing the battery pack of FIG. 1.

Referring to FIG. 3, the metal terminal 50 may be prepared. Preferably, the metal terminal 50 may be made of a copper material with a shape of a circular pillar 40. The metal terminal 50 may include an annular protrusion 23 and a gear-shaped protrusion pattern 29 in order at a sidewall of the circular pillar 40, in a lower portion thereof. In an embodiment, a plurality of protrusions 23 may be positioned in different levels at the sidewall of the circular pillar 40.

In another embodiment, a plurality of protrusion patterns 29 may be positioned in different levels at the sidewall of the circular pillar 40. The protrusion patterns 29 may have saw-tooth portions 26 in the same level at the sidewall of the circular pillar 40. In addition, the metal terminal 50 may have connection grooves 34 at the sidewall of the circular pillar 40 in an upper portion thereof, and the circular pillar 40 may serve as a plug contact 38 in the upper portion thereof.

Preferably, the circular pillar 40 has substantially the same outer diameter at a lower portion of the metal terminal 50 and is tapered from the protrusion pattern 29 toward an end of the plug contact 38 in an upper portion of the metal terminal 50. Here, the plug contact 38 is configured to be inserted into an electric terminal with a cap shape, drawn from an external electric device (not shown), at a periphery of the battery pack 140 of FIG. 1, and the connection grooves 34 may be configured to accommodate hooking protrusions located at an inside of the electric terminal and come into contact with the hooking protrusions, respectively.

Figure 4:
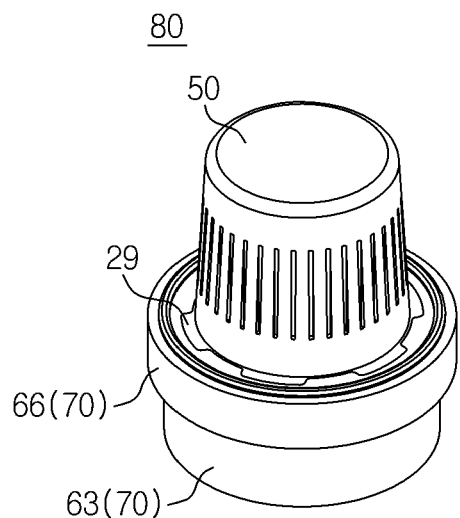

Referring to FIG. 4, the metal terminal 50 may be insert-injected with plastic. By means of the insert-injection, the plastic member 70 may be formed at the lower portion of the metal terminal 50. The plastic member 70 may include the lower buffer 63 and the upper buffer 66 which are positioned in order. Preferably, the lower buffer 63 may surround the annular protrusions 23 of FIG. 3 at the metal terminal 50.

When an external force is applied to the lower buffer 63 at a side opposite to the upper buffer 66, the protrusions 23 may be inserted into the lower buffer 63 and support the lower buffer 63, thereby preventing the plastic member 70 from being separated from the metal terminal 50. In an embodiment, the upper buffer 66 may surround the gear-shaped protrusion patterns 29 of FIG. 3 at the metal terminal 50.

When an external force is applied to the upper buffer 66 around the upper buffer 66, the protrusion patterns 29 may be inserted into the upper buffer 66 and support the upper buffer 66, thereby preventing the plastic member 70 from being separated from the metal terminal 50. Here, the metal terminal 50 and the plastic member 70 may configure the battery connecting unit 80.

Figure 5:
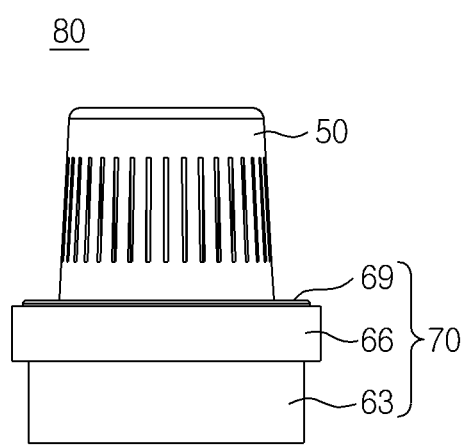

Referring to FIG. 5, at the battery connecting unit 80, the plastic member 70 has a protrusion 69 at an end thereof. Preferably, the protrusion 69 is located around the metal terminal 50 along an end of the upper buffer 66 of the plastic member 70. The protrusion 69 may be located at a front end of the plastic member 70 to come into contact with the upper housing 130 of FIG. 7.

Next, as shown in FIG. 1, the lower housing 90, the battery laminate 100, the electronic circuit part 110 and the upper housing 130 may be prepared individually.

Figure 6:
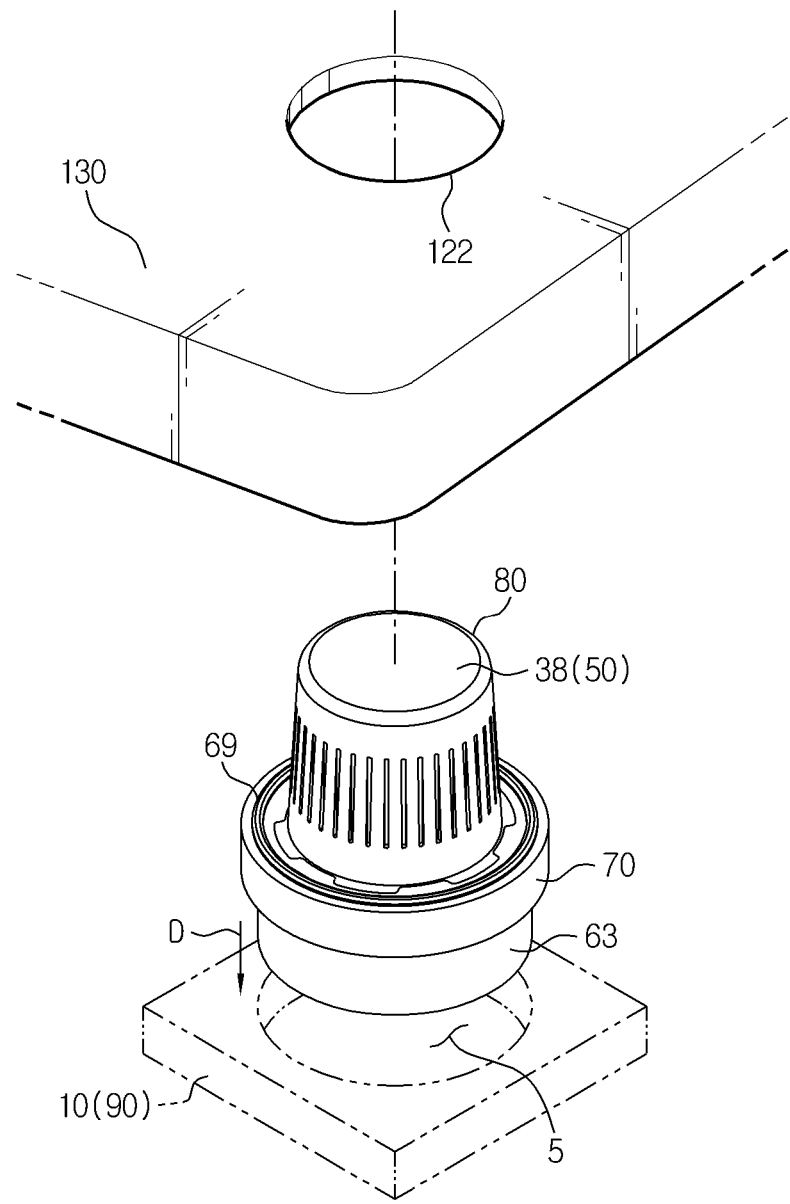

Referring to FIG. 6, regarding the lower housing 90, the battery connecting unit 80 may be placed on the lower housing 90. In more detail, the battery connecting unit 80 may be inserted into the fitting holes 5 of the supports 10 of the lower housing 90 along a predetermined direction D1 through the lower buffer 63 of the plastic member 70.

Subsequently, the battery laminate 100 may be accommodated in the lower housing 90 as shown in FIG. 1.

Preferably, the battery laminate 100 may be electrically connected to the battery connecting unit 80 through the electric line L of FIG. 2. Subsequently, though not shown in the figures, the electronic circuit part 110 may be placed on the battery laminate 100 and electrically connected to the battery laminate. Next, the upper housing 130 may be placed on the lower housing 90, the battery laminate 100 and the electronic circuit part 110. Preferably, the connection window 122 of the upper housing 130 may be aligned with the battery connecting unit 80 of the lower housing 90. In other words, the connection window 122 of the upper housing 130 may be aligned with the plug contact 38 of the metal terminal 50 at the battery connecting unit 80.

Figure 7:
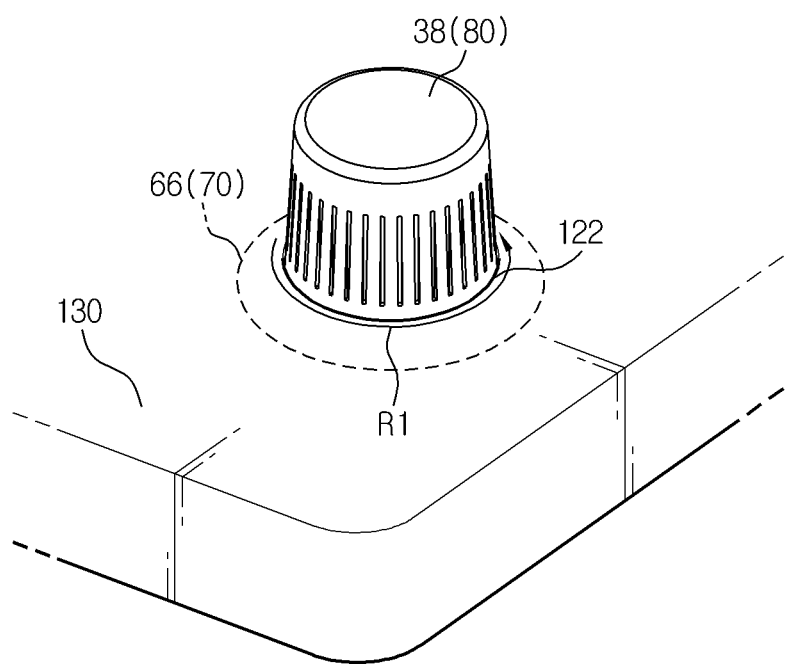

Referring to FIG. 7, the upper housing 130 may be inserted into the battery connecting unit 80 through the connection window 122. Preferably, the plug contact 38 of the battery connecting unit 80 passes through the upper housing 130 via the connection window 122, and the plastic member 70 of the battery connecting unit 80 comes into contact with the upper housing 130.

Here, the upper housing 130 may have flat surfaces at one side coming into contact with the plastic member 70 and the other side opposite thereto. Next, laser welding may be applied to the upper housing 130. Preferably, the laser welding may be applied to the upper housing 130 around the plug contact 38 along a predetermined direction R1.

In more detail, the upper housing 130 may be welded by means of laser welding along the protrusion 69 located at an end of the upper buffer 66 (FIG. 5) of the plastic member 70. Therefore, the upper buffer 66 may be welded to the upper housing 130 made of plastic through its end. By doing so, the plastic member 70 may be fixed to the upper housing 130 at a lower portion of the upper housing 130.

Figure 8:
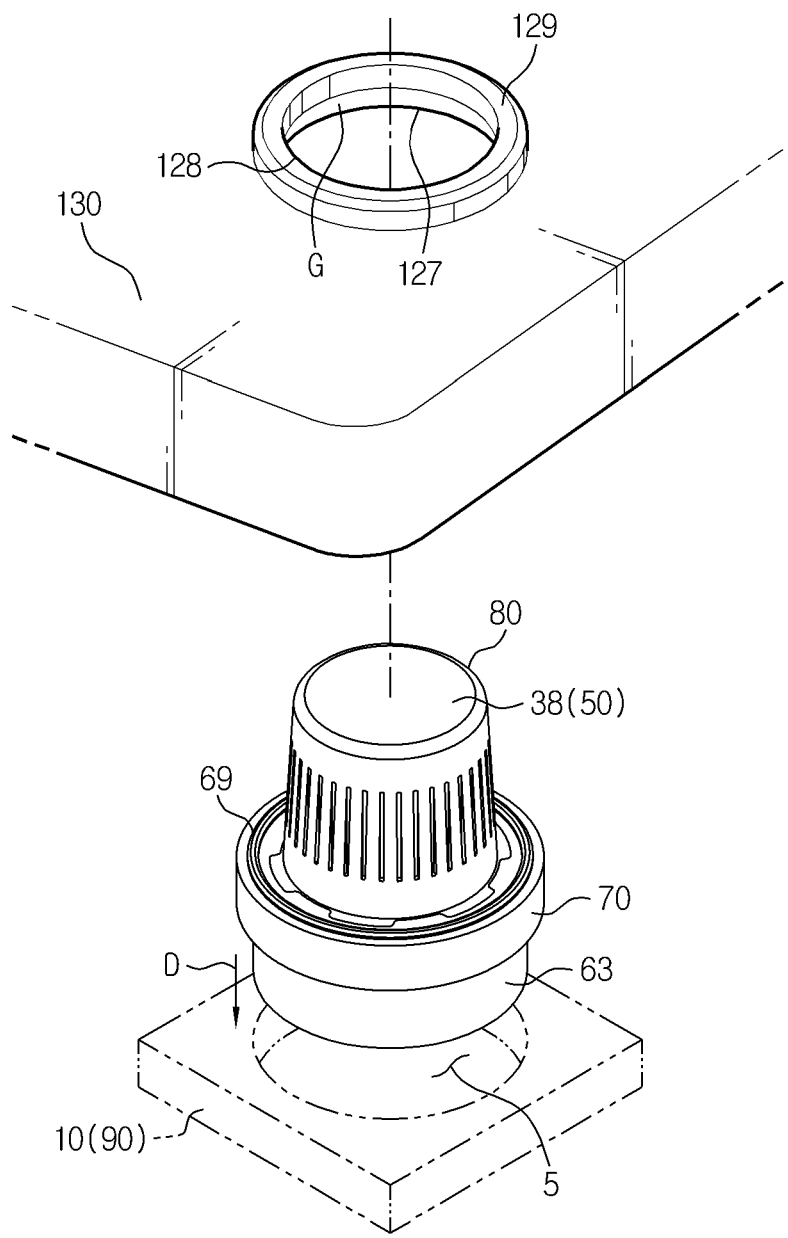
FIGS. 8 and 9 are schematic views for illustrating a method for manufacturing a battery pack according to a modified embodiment of the present disclosure.
Figure 9:
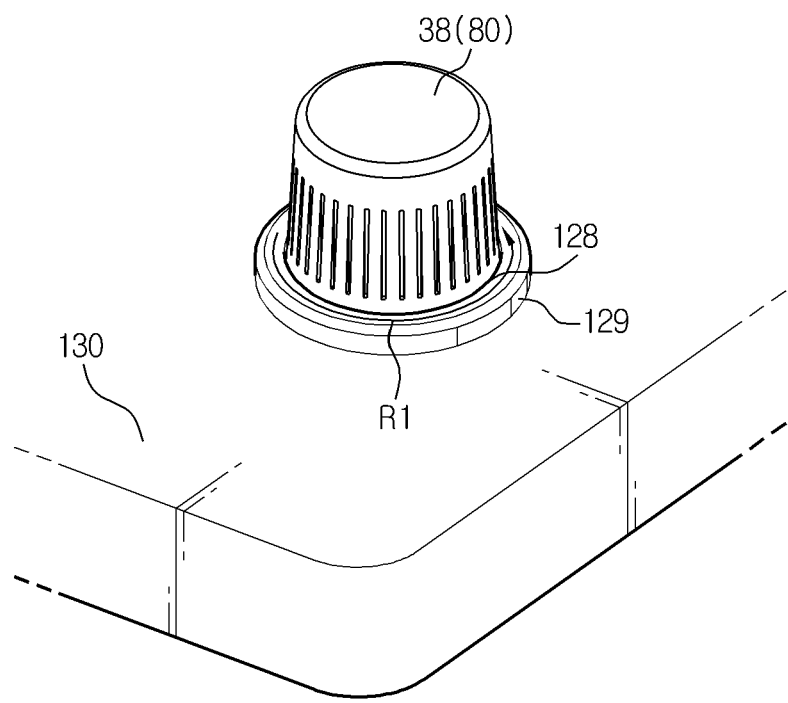

FIGS. 8 and 9 are schematic views for illustrating a method for manufacturing a battery pack according to a modified embodiment of the present disclosure.

Referring to FIGS. 8 and 9, the battery connecting unit 80 of FIG. 6 may be placed on the lower housing 90 and inserted into the connection window 128 of the upper housing 130. The coupling process of the battery connecting unit 80 and the lower housing 90 has been described above with reference to FIG. 6. Here, the upper housing 130 may have a concave portion G formed to accommodate the plastic member 70 at one side coming into contact with the plastic member 70 and a convex portion 129 formed at the other side opposite thereto to correspond to the concave portion G.

Preferably, the upper housing 130 may have an accommodation hole 127 formed at one surface thereof so that the concave portion G is opened. By doing so, the plastic member 70 of the battery connecting unit 80 may be inserted into the concave portion G through the accommodation hole 127. Subsequently, laser welding may be applied to the upper housing 130. Preferably, the laser welding may be applied to the convex portion 129 of the upper housing 130 along a predetermined direction R1.

By doing so, the upper housing 130 may be welded to the protrusion 69 located at the end of the plastic member 70 by means of laser welding.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery connecting unit, which is electrically connected to a battery laminate between a lower housing and an upper housing of a battery pack and includes a plastic member configured to come into contact with the upper housing and a metal terminal inserted into the upper housing,
wherein the plastic member surrounds a lower portion of the metal terminal in a cylindrical shape and exposes an upper portion of the metal terminal, and
wherein the metal terminal is made of a circular pillar and includes an annular protrusion and a gear-shaped protrusion pattern, formed at a sidewall of the circular pillar, in the lower portion of the metal terminal,
wherein the plastic member includes a lower buffer and an upper buffer which are positioned in order, and
wherein the lower buffer has a smaller outer diameter than the upper buffer.

2. The battery connecting unit according to claim 1,
wherein the lower buffer surrounds by the annular protrusion, and
wherein the upper buffer surrounds the gear-shaped protrusion pattern.

3. The battery connecting unit according to claim 1,
wherein the lower buffer is inserted into a support of the lower housing, and
wherein the upper buffer is welded to the upper housing made of plastic through an end thereof.

4. The battery connecting unit according to claim 1,
wherein there is provided a plurality of protrusions positioned in different levels at the sidewall of the circular pillar, and
wherein there is provided a plurality of protrusion patterns positioned in different levels at the sidewall of the circular pillar.

5. The battery connecting unit according to claim 1,
wherein the protrusion pattern has saw-tooth portions in the same level at the sidewall of the circular pillar.

6. The battery connecting unit according to claim 1,
wherein the circular pillar of the metal terminal serves as a plug contact at the upper portion of the metal terminal, and
wherein the circular pillar of the metal terminal has connection grooves at a sidewall of the circular pillar at the upper portion of the metal terminal.

7. The battery connecting unit according to claim 1,
wherein the metal terminal is electrically connected to the battery laminate through the lower buffer.

8. The battery connecting unit of claim 1, wherein the upper portion of the metal terminal is a closed end.

9. A battery pack, comprising:
a lower housing including at least one battery connecting unit;
a battery laminate accommodated in the lower housing and electrically connected to the battery connecting unit; and
an upper housing made of plastic and configured to cover the lower housing and the battery laminate,
wherein the battery connecting unit includes a metal terminal and a plastic member partially surrounding the metal terminal,
wherein the metal terminal is provided through the upper housing, and the plastic member is fixed to the upper housing at a lower portion of the upper housing,
wherein the plastic member extends into the upper housing through an upper surface of the upper housing,
wherein the metal terminal is made of a circular pillar and includes an annular protrusion and a gear-shaped protrusion pattern, formed at a sidewall of the circular pillar, in the lower portion of the metal terminal, and the circular pillar of the metal terminal serves as a plug contact at the upper portion of the metal terminal,
wherein the plastic member includes a lower buffer and an upper buffer which are positioned in order and formed integrally,
wherein the lower buffer has a cylindrical shape to surround the annular protrusion, and
wherein the upper buffer has a cylindrical shape with a greater outer diameter than the lower buffer to surround the gear-shaped protrusion pattern.

10. The battery pack according to claim 9,
wherein the upper housing has flat surfaces at one side coming into contact with the plastic member and the other side opposite thereto.

11. The battery pack according to claim 10,
wherein the upper housing is welded along a protrusion located at an end of the plastic member by means of laser welding.

12. A battery pack, comprising:
a lower housing including at least one battery connecting unit;
a battery laminate accommodated in the lower housing and electrically connected to the battery connecting unit; and
an upper housing made of plastic and configured to cover the lower housing and the battery laminate,
wherein the battery connecting unit includes a metal terminal and a plastic member partially surrounding the metal terminal, wherein the metal terminal is provided through the upper housing, and the plastic member is fixed to the upper housing at a lower portion of the upper housing, wherein the plastic member extends into the upper housing through an upper surface of the upper housing, and wherein the upper housing has a concave portion formed at one side in contact with the plastic member to accommodate the plastic member and a convex portion formed at the other side to correspond to the concave portion.

13. The battery pack according to claim 12, wherein the metal terminal is made of a circular pillar and includes an annular protrusion and a gear-shaped protrusion pattern, formed at a sidewall of the circular pillar, in the lower portion of the metal terminal, and the circular pillar of the metal terminal serves as a plug contact at the upper portion of the metal terminal.

14. The battery pack according to claim 13, wherein the plastic member includes a lower buffer and an upper buffer which are positioned in order and formed integrally, wherein the lower buffer has a cylindrical shape to surround the annular protrusion, and wherein the upper buffer has a cylindrical shape with a greater outer diameter than the lower buffer to surround the gear-shaped protrusion pattern.

15. The battery pack according to claim 12, wherein the upper housing is welded to a protrusion located at an end of the plastic member along the convex portion by means of laser welding.

\* \* \* \* \*